(No Model.) 2 Sheets—Sheet 1.
H. J. BUELL.
GEAR CASE FOR BICYCLES.
No. 588,124. Patented Aug. 17, 1897.
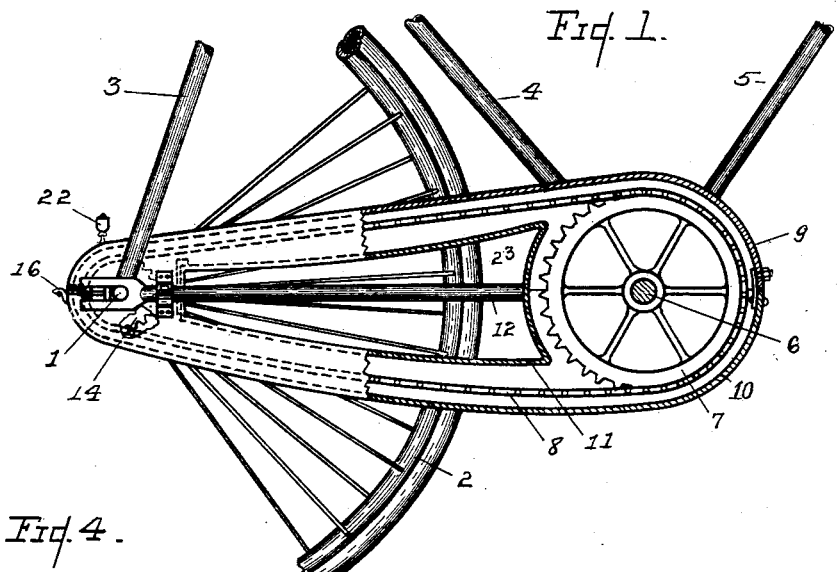
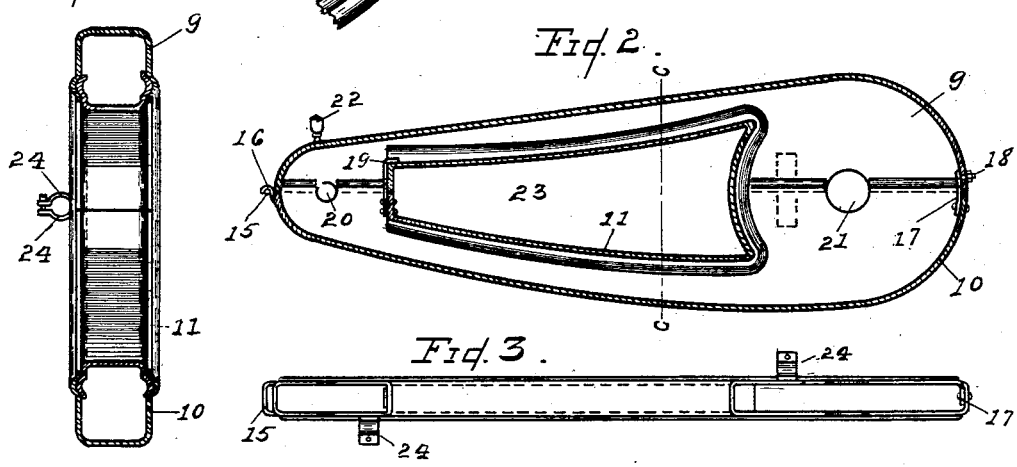
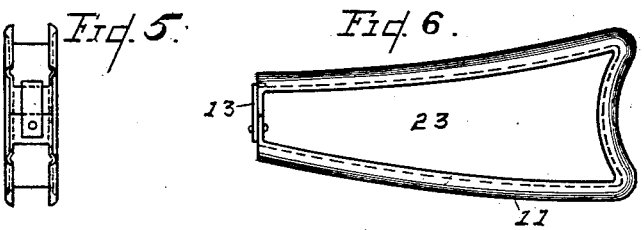
WITNESSES:
N. Webster Schlater
Minnie E. Schlater
Harry J. Buell
INVENTOR
BY Chapin & Denny
his ATTORNEYS.

(No Model.) 2 Sheets—Sheet 2.
H. J. BUELL.
GEAR CASE FOR BICYCLES.
No. 588,124. Patented Aug. 17, 1897.
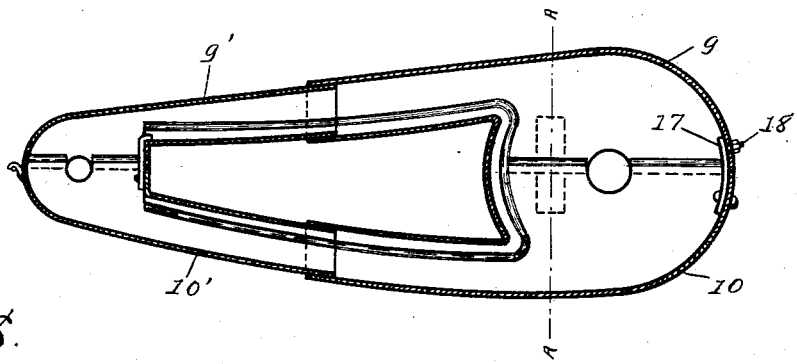
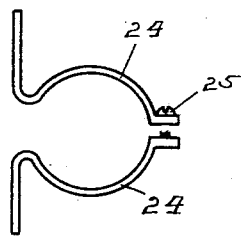
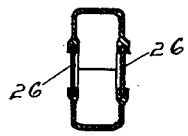
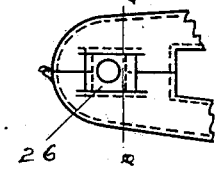
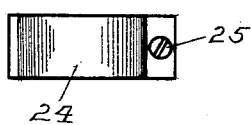
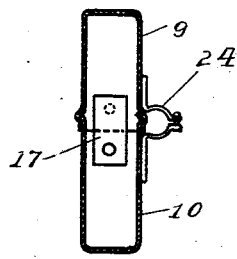
WITNESSES: Harry J. Buell INVENTOR
N. Webster Schlater
Minnie E. Schlater BY Chapin & Denny
his ATTORNEYS

United States Patent Office.

HARRY J. BUELL, OF FORT WAYNE, INDIANA, ASSIGNOR TO LOUIS A. CENTLIVRE, OF SAME PLACE.

GEAR-CASE FOR BICYCLES.

SPECIFICATION forming part of Letters Patent No. 588,124, dated August 17, 1897.

Application filed January 18, 1897. Serial No. 619,513. (No model.)

*To all whom it may concern:*

Be it known that I, HARRY J. BUELL, a citizen of the United States, residing at Fort Wayne, in the county of Allen, in the State of Indiana, have invented certain new and useful Improvements in Gear-Cases for Bicycles; and I do hereby declare that the following is a full, clear, and exact description of the invention, which will enable others skilled in the art to which it appertains to make and use the same, reference being had to the accompanying drawings, which form part of this specification.

My invention relates to improvements in detachable cases or shields for inclosing the chain driving-gear of bicycles and other cycles.

It is well known that the sprocket-wheels and driving-chain of all ordinary cycles in common use are not inclosed or protected, and are so located relative to the ground or supporting wheels as to collect and retain dust and mud when in use, thereby greatly impairing the efficiency, security, and ease of operation of the vehicle by increasing the friction of the driving-gear and subjecting it to greater wear.

The object, therefore, of my invention is to provide a light, neat, cheap, and substantial case or shield for inclosing the chain driving-gear of bicycles or other cycles, so constructed and arranged as to be readily and conveniently detached or replaced in position and also adapted for a limited longitudinal adjustment for the varying distance between the supporting-wheels.

In the accompanying drawings similar reference-numerals indicate corresponding parts throughout the several views.

Figure 1 is a side view of my invention, partly in section, in position for use upon a bicycle shown only in part, showing the relative arrangement of the inclosed driving-gear. Fig. 2 is a detail of my improved gear-case in longitudinal central section. Fig. 3 is a detail plan of the lower case-section, showing the arrangement of the means for securing it to the bicycle-frame. Fig. 4 is a cross-section of Fig. 2 on the line C C, looking toward the rear end thereof, showing the manner of interlocking with the adjacent edges of the respective case-sections. Fig. 5 is a rear end view of the closer, showing the retaining-spring and the corrugated sides thereof. Fig. 6 is a side view of the closer. Fig. 7 is a modified form of my invention, showing the case-sections constructed with telescoping sections. Figs. 8 and 9 are enlarged details of the clip by which my improvement is rigidly attached to the bicycle-frame. Fig. 10 is an end view in cross-section of the reduced end of my improved case on the line B B of Fig. 11, showing the manner of securing the adjustable slides employed in another modified form. Fig. 11 is a side view of the rear end of my invention, showing one of the adjustable plates in position therein. Fig. 12 is a view in cross-section on the line A A, looking toward the forward end thereof.

My improved gear-case of sheet metal, preferably stamped or pressed from sheet-aluminium of sufficient thickness to give it strength, firmness, and durability while at the same time preserving its lightness, is formed of two nearly equal parts or sections 9 and 10, which are uniform in thickness and of nearly equal width, the lower section 10 having its lower side slightly bowed or convex to permit a limited amount of slack in the driving-chain 8 without contact or friction therewith. The said hollow case-sections 9 and 10 are each designed to be stamped or pressed from a single piece of sheet metal, preferably aluminium, with a sufficient width of space between their sides to receive and contain with proper clearance the sprocket-wheel 7, fixed, as usual, on the crank-shaft 6, the sprocket-wheel 14 on the rear axle 1 and the driving-chain 8 connecting said wheels, Fig. 1. When the said case-sections are united, the properly-corrugated meeting edges thereof will form a close dust-proof interlocking union and are rigidly but detachably secured together as follows: On the rear end of the upper case-section 9 and at or near the upper edge thereof is rigidly secured a rearwardly-projecting horizontal transverse loop or eye 15, Figs. 2 and 3, adapted for a locked engagement with the downwardly-curved hook 16, rigidly fixed upon the rear end of said case-section 10 at or near the upper end thereof, thereby rigidly securing the rear ends of said sections against either lateral or longitudinal displacement. To the inner face of the forward end of said case-section 10 and near the upper edge thereof is rigidly secured by a rivet, bolt, or other proper manner, an upwardly-projecting spring 17, Figs. 2 and 7, having upon its upper end a fixed outwardly-projecting threaded bolt 18. At a proper point near the lower edge of the forward end of said section 9 is arranged a suitable perforation adapted to receive the said bolt 18, which is then secured therein by a proper threaded nut on the free end of said bolt, Fig. 7, thereby rigidly securing said forward ends together.

The closer 11 is made of one piece of sheet metal, preferably aluminium, folded upon itself, having its forward end and diverging sides made slightly concavo-convex, the said forward end being adapted to conform to the adjacent perimeter of the said wheel 7, the upper side to permit of a limited slack of the driving-chain and the lower side to conform to the convex lower side of said section 10. The free ends of said closer are bent to meet in a perpendicular plane and are rigidly secured together by a bent spring 19 when in position, whose lower end is rigidly secured to one of said ends and whose free end is adapted to holdingly engage the other meeting end of said closer, as seen in Fig. 2. The edges of the said closer 11 are properly corrugated and are adapted to be embraced by and form a holding engagement with the adjacent sides of the said united sections, which are also correspondingly corrugated, as shown in Figs. 2, 4, and 7. When the said closer is thus placed in position, it cannot be displaced under ordinary conditions of service except by the removal of the said case-section 9. The said case-sections at their junction are provided with suitable lateral openings 20 and 21, the former for the axle 1 of the rear wheel 2 and the latter for the hub or journal of the crank-shaft 6. The rear and reduced end of section 9 is provided upon its upper face with a proper oil-cup 22 for the purpose of lubricating the said driving-chain.

When the said gear-case is placed in position, the tubular brace-rod 12 will pass diagonally through the opening 23 in the said closer 11, the rear end of said case being arranged between the rear wheel 2 and the seat-supporting rod 3 and the outer end thereof being arranged between the frame-section 4 and 5 and the pedal-crank. The said gear-case thus arranged is rigidly secured to the said rod 12 near the extremities by the two-part clips 24, identical in construction, or other proper manner. The said clips, Fig. 8, have their bases riveted to the respective case-sections 9, Figs. 1 and 2, and have their outer ends provided with screw-threaded perforations, and are then rigidly secured together by the screw 25 in said perforations.

In Fig. 7 is shown a modified construction in which each case-section is formed of two telescoping sections, the rear sections 9' and 10' telescoping with the forward sections 9 and 10 to a sufficient extent to afford a limited longitudinal adjustment or extension of said gear-case for variations in the distance between two revoluble wheels. In this construction the said closer 11 is also made correspondingly telescoping.

In Figs. 10 and 11 is shown another modification for fitting different sizes of wheels, consisting of a pair of laterally-apertured plates 26, slidingly mounted in proper longitudinal guideways in the opposite sides of the rear end of said gear-case, the coincident openings of said plates being adapted to admit the said rear axle 1, though the preferred form of construction is that shown in Fig. 1.

Referring now to the preferred form of construction, the manner of placing my improvement in position for use and of detaching the same is briefly stated as follows: The operator first places the rear end thereof in position on the said axle 1, as described, with the hook 16 in a locked engagement with the fixed loop or eye 15. The closer 11 is then sprung into position, crossing the said rod 12 diagonally, the corrugated edges of said closer interlocking with the adjacent corrugated edges of said case-sections, the spring 19 preventing the rear ends of said closer from spreading; the forward end of said case-sections being at the same time fitted about the said crank-shaft and rigidly united by means of the said spring 17 and the nut 18. The said clips 24 are then rigidly secured to the respective ends of the said rod 12 by the said holding-screws, the adjacent edges of the said sections being provided with interlocking corrugations. The said driving gear will then be free to operate in said case without impinging upon any portion thereof, as the sides are constructed to permit a limited slack of both the upper and lower portion of the driving-chain.

To remove my improved gear-case, the screws in the said clip 24 are removed and the spring 17 disengaged from the adjacent end of said section 9, after which the said case-sections can readily be detached from their interlocked union with the closer 11 and readily removed. By disengaging the free end of said spring 19 the meeting ends of said closer 11 can be sufficiently spread to permit of its ready removal from the rod 12. My improved gear-case is thus light, simple, and economical in construction, of few parts, readily and conveniently placed in position or removed therefrom, and is absolutely dust-proof.

The manner of operating the modified forms is substantially identical with that described.

Having thus described my invention and the manner of employing the same, what I desire to secure by Letters Patent is—

1. In a gear-case for bicycles, the combination of two separable interlocking sections, each formed of a single piece of sheet metal;

an interlocking closer formed of a single piece of metal folded upon itself, as described, and having its interlocking edges corrugated for the purpose specified; and means for detachably securing said case-sections together and to the bicycle-frame, all substantially as described.

2. A two-part gear-case for bicycles, comprising two separable interlocking sections 9 and 10, each section being stamped from a single piece of sheet metal, having means for rigidly securing the ends of said sections, and a closer 11 folded and corrugated as described, and adapted to admit the brace rod 12 and to close the inner and open faces of the said case-sections by an interlocking engagement with the sides thereof, all substantially as described.

Signed by me, at Fort Wayne, Allen county, State of Indiana, this 11th day of January, A. D. 1897.

HARRY J. BUELL.

Witnesses:
　IDA L. ROSS-LEWIN,
　WILMER LEONARD.